(12) United States Patent
Long et al.

(10) Patent No.: US 9,303,718 B2
(45) Date of Patent: Apr. 5, 2016

(54) NOISE REDUCTION STRUCTURE

(71) Applicants: Panasonic Ecology Systems Guangdong Co., Ltd., Foshan, Guangdong (CN); Panasonic Corporation, Osaka (JP)

(72) Inventors: Min Long, Guangdong (CN); Qiang Guo, Guangdong (CN); Guanxian Liang, Guangdong (CN); Kouji Shinzaki, Aichi (JP)

(73) Assignees: Panasonic Ecology Systems Guangdong Co., Ltd., Guangdong (CN); Panasonic Corporation, Osaka (JP)

( * ) Notice: Subject to any disclaimer, the term of this patent is extended or adjusted under 35 U.S.C. 154(b) by 0 days.

(21) Appl. No.: 14/645,609

(22) Filed: Mar. 12, 2015

(65) Prior Publication Data

US 2015/0276011 A1    Oct. 1, 2015

(30) Foreign Application Priority Data

Mar. 28, 2014    (CN) .......................... 2014 1 0123333

(51) Int. Cl.
*F16F 15/08*    (2006.01)
*F16M 7/00*    (2006.01)

(52) U.S. Cl.
CPC . *F16F 15/08* (2013.01); *F16M 7/00* (2013.01)

(58) Field of Classification Search
CPC ............. F16F 15/08; F16F 15/02; F16F 3/08; F16M 7/00; B60N 2/544; B60N 2/522
USPC .......................... 248/636, 560, 559, 562, 566
See application file for complete search history.

(56) References Cited

U.S. PATENT DOCUMENTS

| | | | | |
|---|---|---|---|---|
| 4,629,154 A * | 12/1986 | Kataczynski | ........... | F21V 15/04 248/610 |
| 4,915,334 A * | 4/1990 | White | ...................... | F16M 7/00 248/188.4 |
| 5,313,780 A * | 5/1994 | Williams | .................. | F16L 3/00 184/6.11 |
| 8,727,300 B2 * | 5/2014 | Maier | ...................... | F16M 7/00 248/300 |

\* cited by examiner

*Primary Examiner* — Nkeisha Smith
(74) *Attorney, Agent, or Firm* — RatnerPrestia

(57) ABSTRACT

A noise reduction structure between a power source and a fixing plate includes: a buffer member having a first opening through upper and lower faces of a body, upper lower portions of the buffer member respectively extending transversely to form upper and lower portion extensions with a gap therebetween; a rigid support portion includes an upper plate block having a second opening, a lower plate block having a third opening, and a stop block connecting the upper plate block and the lower plate block, the buffer member being embedded and engaged between the upper and lower plate blocks; a connecting member having a free end provided with an engagement portion engaged within the gap and a fixing end connected onto the fixing plate; and a fixing rod running through the power source, connecting and fixing the support portion and the power source, being separated from the fixing plate.

11 Claims, 9 Drawing Sheets

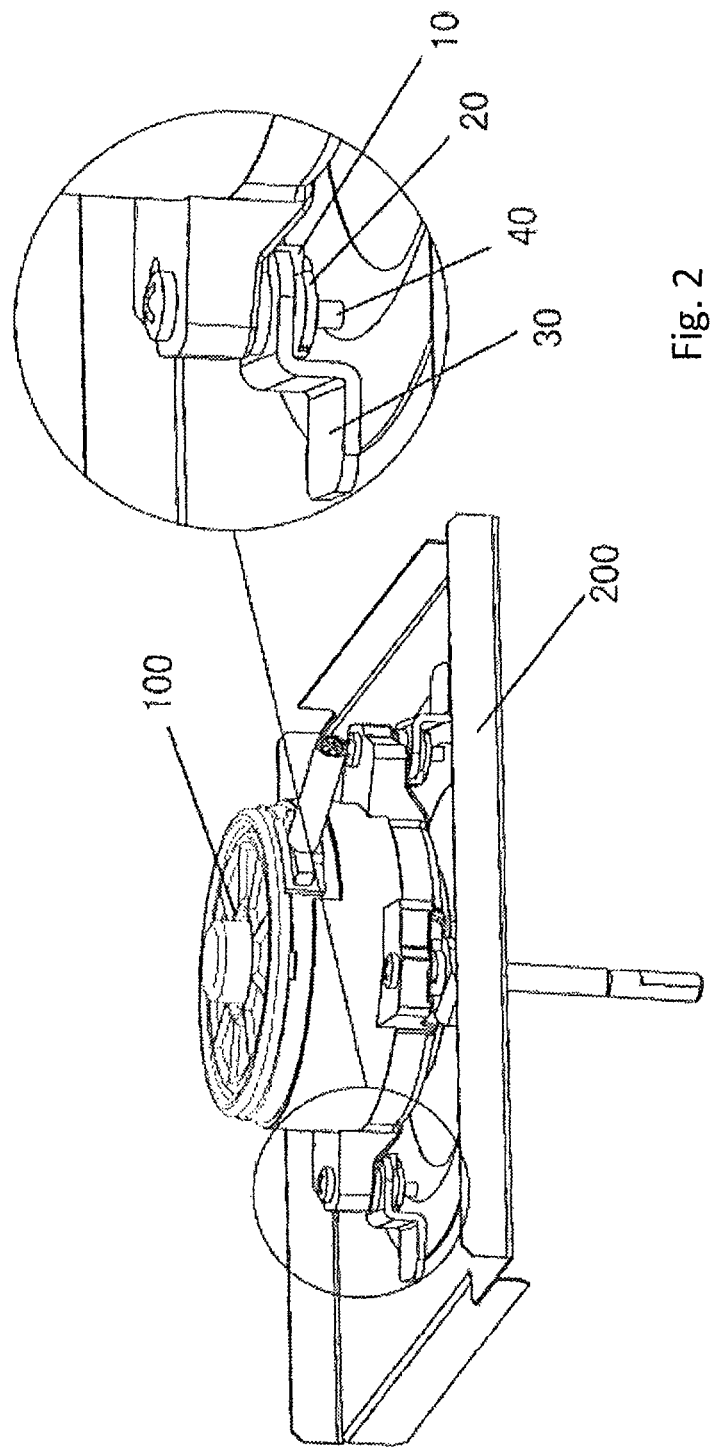

NOISE REDUCTION STRUCTURE

CROSS-REFERENCE TO RELATED APPLICATION

This application claims the benefit of Chinese Patent Application No. 201410123333.3 filed on Mar. 28, 2014 in the State Intellectual Property Office of China, the whole disclosure of which is incorporated herein by reference.

BACKGROUND OF THE INVENTION

1. Field of the Invention

The present invention generally relates to a noise reduction structure, and more particularly, to a structure for reducing noise due to vibration generated by a power source.

2. Description of the Related Art

FIG. 1A is a schematic diagram showing a well known power source fixing structure; and FIG. 1B is a schematic diagram showing the well known power source fixing structure shown in FIG. 1A being not mounted correctly.

As shown in FIG. 1A, the power source fixing structure 1 comprises: a power source 2, a fixing plate 3 for fixing the power source 2, and a fixing rod 4 connecting the power source 2 and the fixing plate 3. The power source 2 can be fixed on the fixing plate 3 through the fixing rod 4. However, when the power source 2 operates, the vibration generated by the power source 2 will be delivered to the fixing plate 3 through the fixing rod 4 so that the vibration is diffused toward the fixing plate 3, resulting in increased noise. Low noise and quietness are required especially for electrical apparatuses mounted indoor. Thus, it will be easily occurred to those skilled in the art to mount a buffer member, such as the buffer members 5, 5' between the power source 2 and the fixing plate 3 so as to reduce the noise due to the vibration generated by the power source 2, as shown in FIG. 1B. In this case, however, only a small portion of the vibration is absorbed by the buffer member, and most of the vibration will be delivered to the fixing plate 3 through the fixing rod 4. Thus, even if the buffer members 5, 5' are mounted, the noise due to the vibration generated by the power source 2 cannot be effectively reduced.

In addition, due to connection provided by the fixing rod 4, it is required to thread nuts 6 finally so that the power source 2, the buffer members 5, 5', and the fixing plate 3 can be fixed on the fixing rod 4. However, since the buffer members 5, 5' are elastic, if the nut is threaded too tightly by an operator, the buffer members 5, 5' will be pressed and deformed, thereby adversely affecting vibration absorbing effect of the buffer members 5, 5'.

Moreover, since it is required to connect the power source 2 at more than two locations thereof to the fixing plate 3 by the fixing rod 4 so that the power source 2 can be firmly connected onto the fixing plate 3, the buffer members 5, 5' need to be mounted at the respective locations. However, when tightened forces of the nuts 6 by the operator are not uniform, the buffer members 5, 5' will be pressed and deformed non-uniformly at the respective locations, as shown in FIG. 1B. In FIG. 1B, the buffer member 5 at left side is pressed to a larger degree than the buffer member 5' at right side, thus, the power source 2 tends to incline toward the side of the more largely pressed buffer member 5, thereby increasing the noise.

SUMMARY OF THE INVENTION

One object of the present invention is to provide a noise reduction structure, which not only facilitates mounting, but also can prevent the buffer member from being deformed.

In order to achieve the object, the present invention provides a noise reduction structure between a power source and a fixing plate, comprising:

a buffer member provided with a first opening penetrating through upper and lower faces of a body of the buffer member, an upper portion and a lower portion of the buffer member respectively extending transversely to form an upper portion extension and a lower portion extension with a gap therebetween;

a support portion made of a rigid material and comprised of an upper plate block provided with a second opening, a lower plate block being provided with a third opening, and a stop block connecting the upper plate block and the lower plate block, the buffer member being embedded and engaged between the upper plate block and the lower plate block;

a connecting member having a free end provided with an engagement portion engaged with the gap and a fixing end connected onto the fixing plate; and a fixing rod penetrating through the power source, connecting and fixing the support portion and the power source, but the fixing rod is separated from the fixing plate. In one example, the fixing rod is inserted into the second opening of the upper plate block, the first opening of the buffer member and the third opening of the lower plate block in sequence.

In another example, the engagement portion of the connecting member is Q-shaped or U-shaped so as to form a first protrusion and a second protrusion, a distance between the first protrusion and the second protrusion is less than a diameter of the buffer member in the gap, and an internal portion of the buffer member is formed as a cylinder.

In another example, the buffer member is provided with a first protection block and a second protection block for preventing the stop block from contacting the first protrusion and the second protrusion, the first protrusion contacts the first protection block, the second protrusion contacts the second protection block, and the stop block is arranged between the first protection block and the second protection block.

In another example, a distance between the first protrusion and second protrusion is less than a diameter of the fixing rod.

In another example, the upper portion and the lower portion of the buffer member are provided with a first projection portion and a second projection portion respectively, the upper plate block of the support portion is provided with a first notch engaged with the first projection portion, and the lower plate block of the support portion is provided with a second notch engaged with the second projection portion.

In another example, the third opening of the support portion is provided to extend downward and formed with a threaded recess.

In another example, the fixing rod is a screw or a threaded rod with a nut.

In another example, the engagement portion of the connecting member is in an opening shape formed as a fourth opening, an internal portion of the buffer member is formed as a cylinder, and a diameter of the fourth opening is larger than that of the cylinder.

In another example, the buffer member is comprised of an end cylindrical portion of the upper portion extension, an end cylindrical portion of the lower portion extension, and a middle cylindrical portion of the internal cylinder, diameters of the end cylindrical portions are larger than that of the fourth opening and are two times of a diameter of the middle cylindrical portion or less, and the end cylindrical portions are sized such that they are insertable through and mountable in the fourth opening of the engagement portion of the connecting member after being elastically deformed by a finger.

The noise reduction structure according to any aspect of the present invention described above provides advantages of reducing noise while improving mounting stability.

BRIEF DESCRIPTION OF THE DRAWINGS

The above and other features of the present invention will become more apparent by describing in detail exemplary embodiments thereof with reference to the accompanying drawings, in which:

FIG. 2 is a schematic diagram showing an overall structure according to a first embodiment of the present invention;

DETAILED DESCRIPTION OF PREFERRED EMBODIMENTS OF THE INVENTION

Figure 1A:
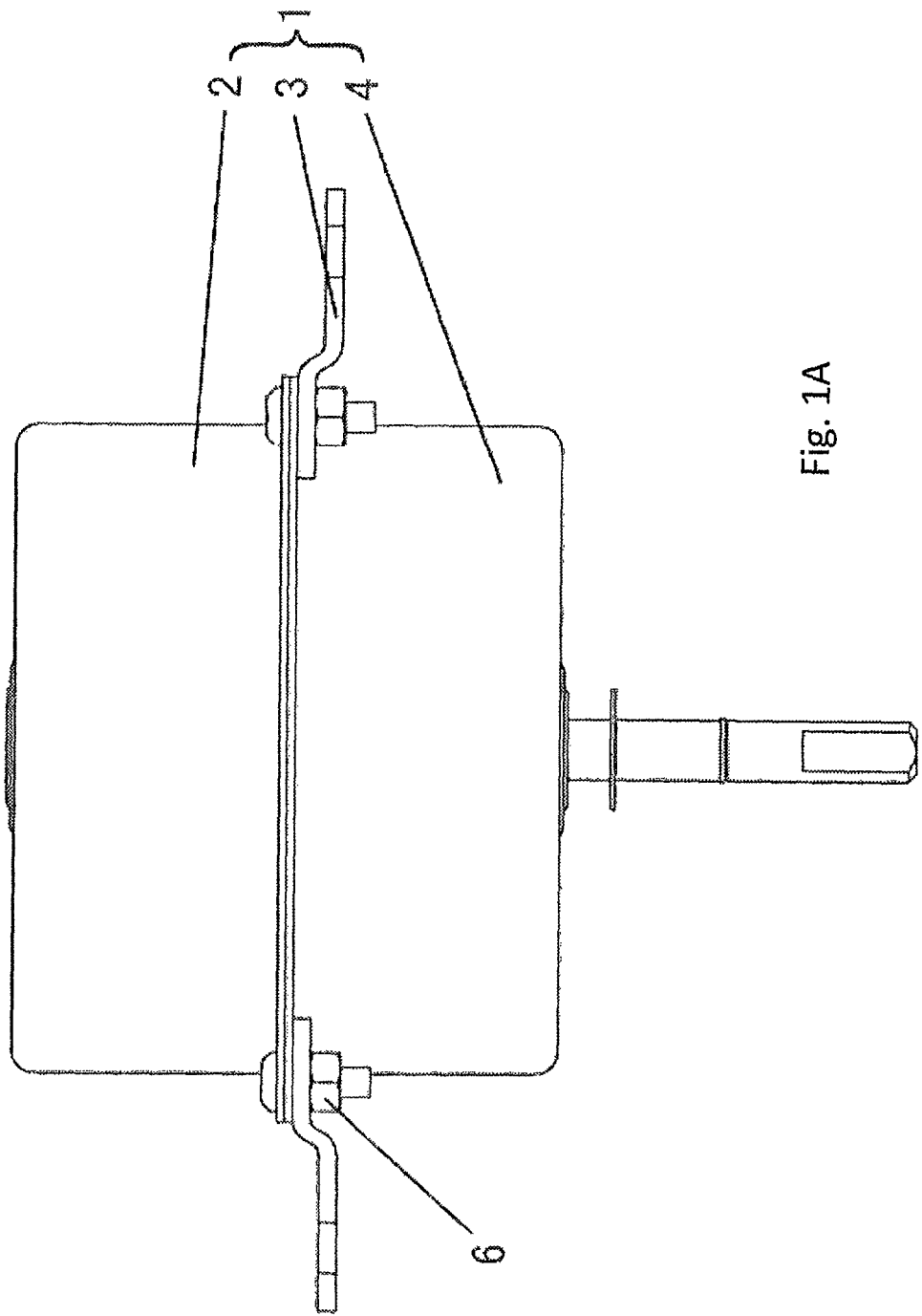
FIG. 1A is a schematic diagram showing a well known power source fixing structure.
Figure 1B:
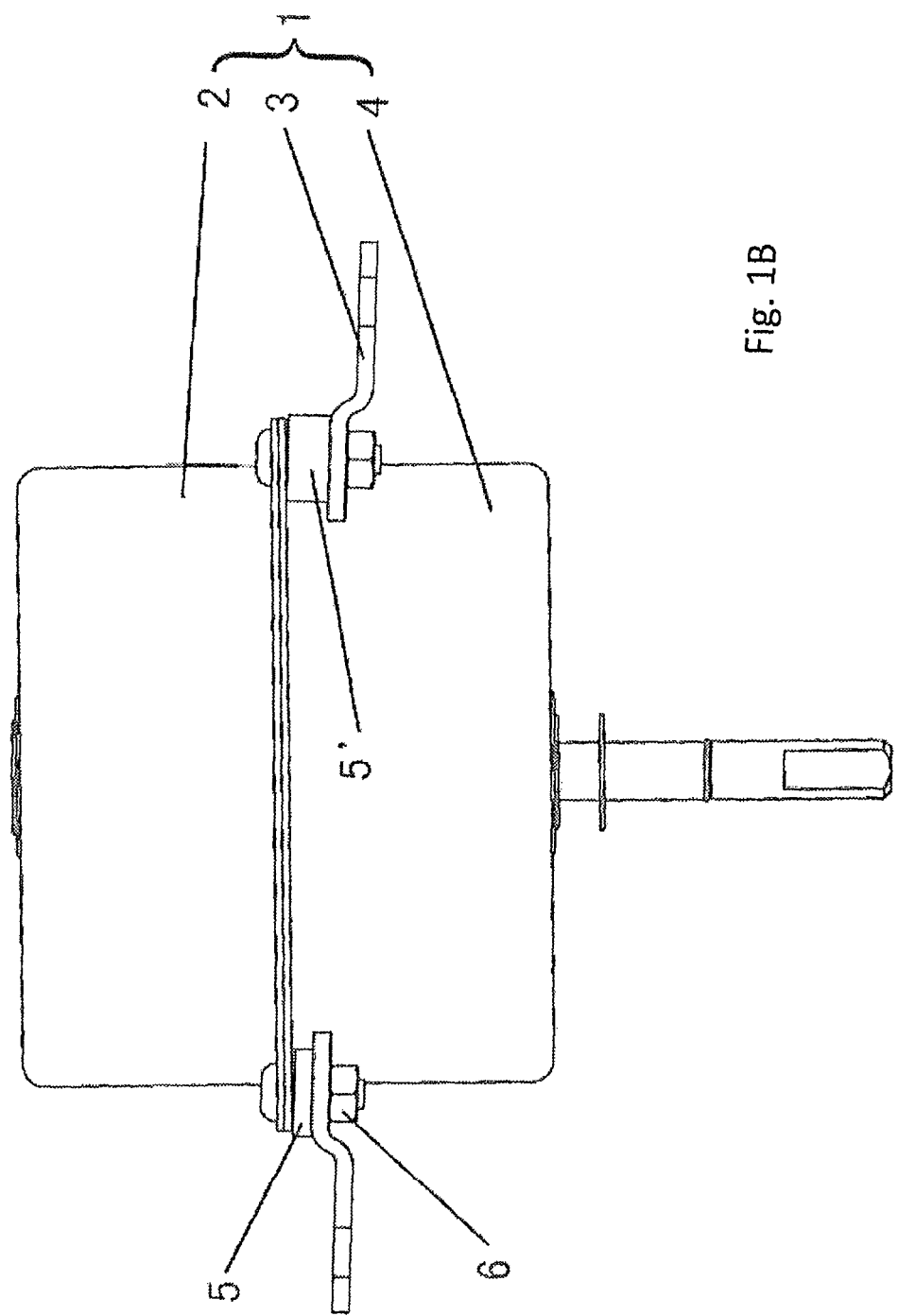
FIG. 1B is a schematic diagram showing the well known power source fixing structure shown in FIG. 1A being not mounted correctly.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

FIG. 2 is a schematic diagram showing an overall structure according to a first embodiment. As shown in the figure, a noise reduction structure according to the first embodiment comprises a buffer member 10, a support portion 20, a connecting member 30, and a fixing rod 40 between the power source 100 and the fixing plate 200. The fixing rod 40 runs through the power source 100, connects and fixes the support portion 20 and the power source 100, but the fixing rod 40 and the fixing plate 200 do not contact with each other and are separated from one another.

Figure 3A:
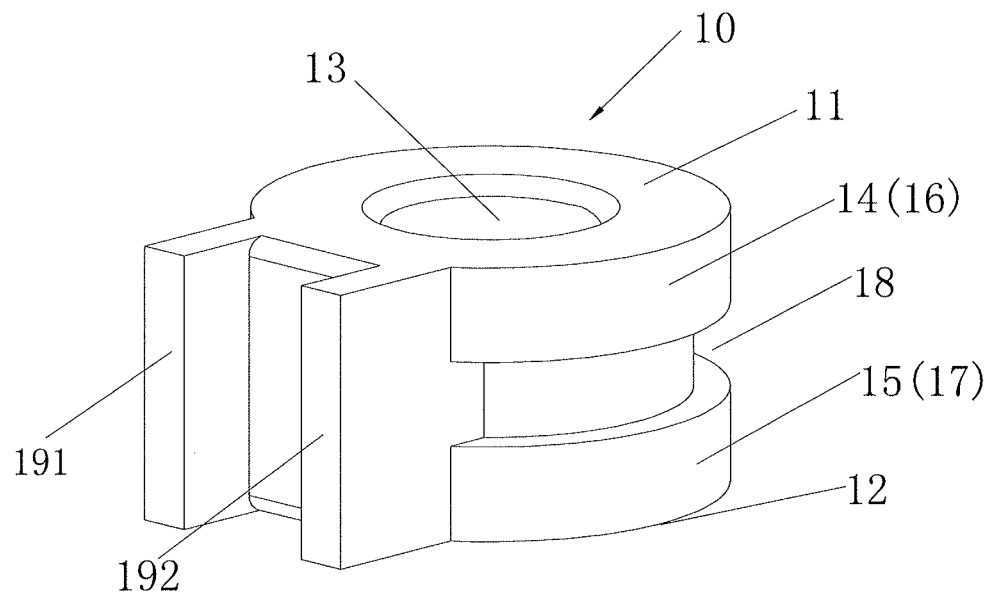
FIG. 3A is a perspective schematic diagram of a buffer member according to the first embodiment of the present invention.
Figure 3B:
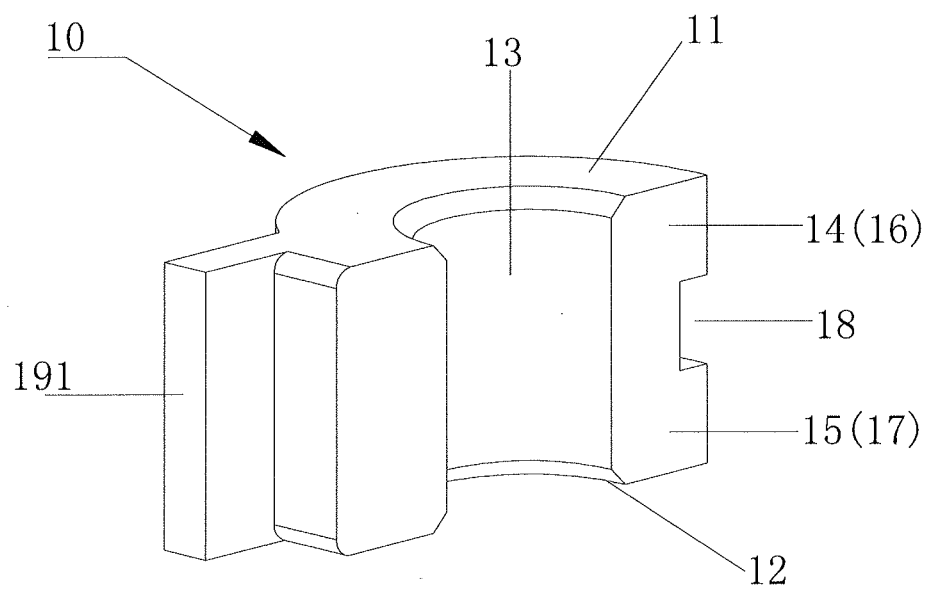
FIG. 3B is a cross sectional view of the buffer member according to the first embodiment of the present invention.

FIG. 3A is a perspective schematic diagram of a buffer member according to a first embodiment; and FIG. 3B is a cross sectional view of the buffer member according to the first embodiment. As shown, the buffer member 10 is provided with a first opening 13 penetrating through an upper 11 and a lower face 12 of a body of the buffer member 10, an upper portion 14 and a lower portion 15 of the buffer member 10 respectively extend transversely to form an upper portion extension 16 and a lower portion extension 17 with a gap 18 therebetween.

Figure 4:
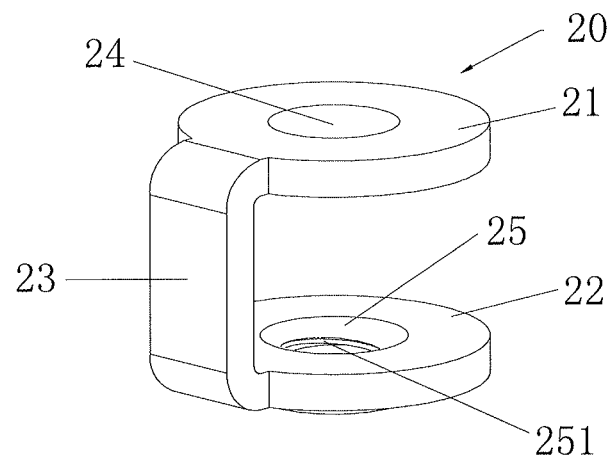
FIG. 4 is a schematic diagram of a support portion according to the first embodiment of the present invention.

FIG. 4 is a schematic diagram of a support portion according to the first embodiment. As shown, the support portion 20 is comprised of an upper plate block 21 provided with a second opening 24, a lower plate block 22 being provided with a third opening 25, and a stop block 23 connecting the upper plate block 21 and the lower plate block 22. The buffer member 10 is embedded and engaged between the upper plate block 21 and the lower plate block 22.

Figure 5:
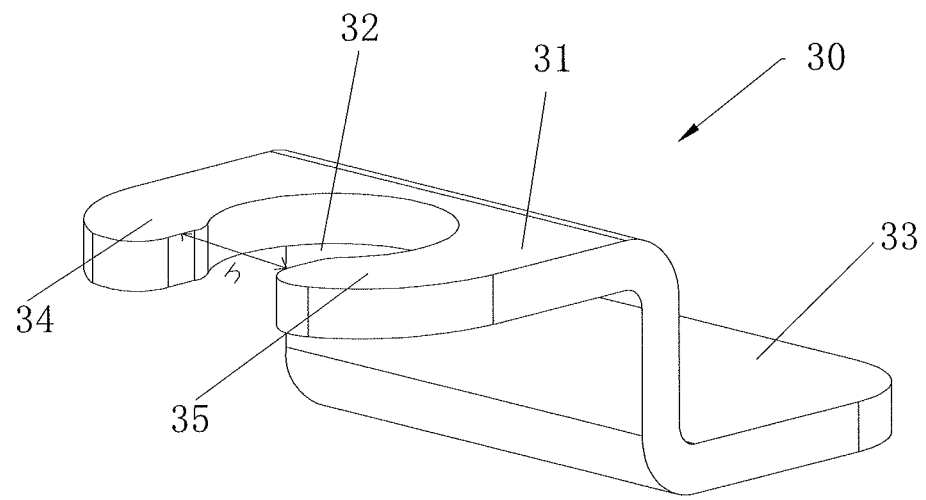
FIG. 5 is a schematic diagram of a connecting member according to the first embodiment of the present invention.

FIG. 5 is a schematic diagram of a connecting member according to the first embodiment. As shown, the connecting member 30 has a free end 31 provided with an engagement portion 32 engaged with the gap 18 and a fixing end 33 connected onto the fixing plate 200.

Figure 6:
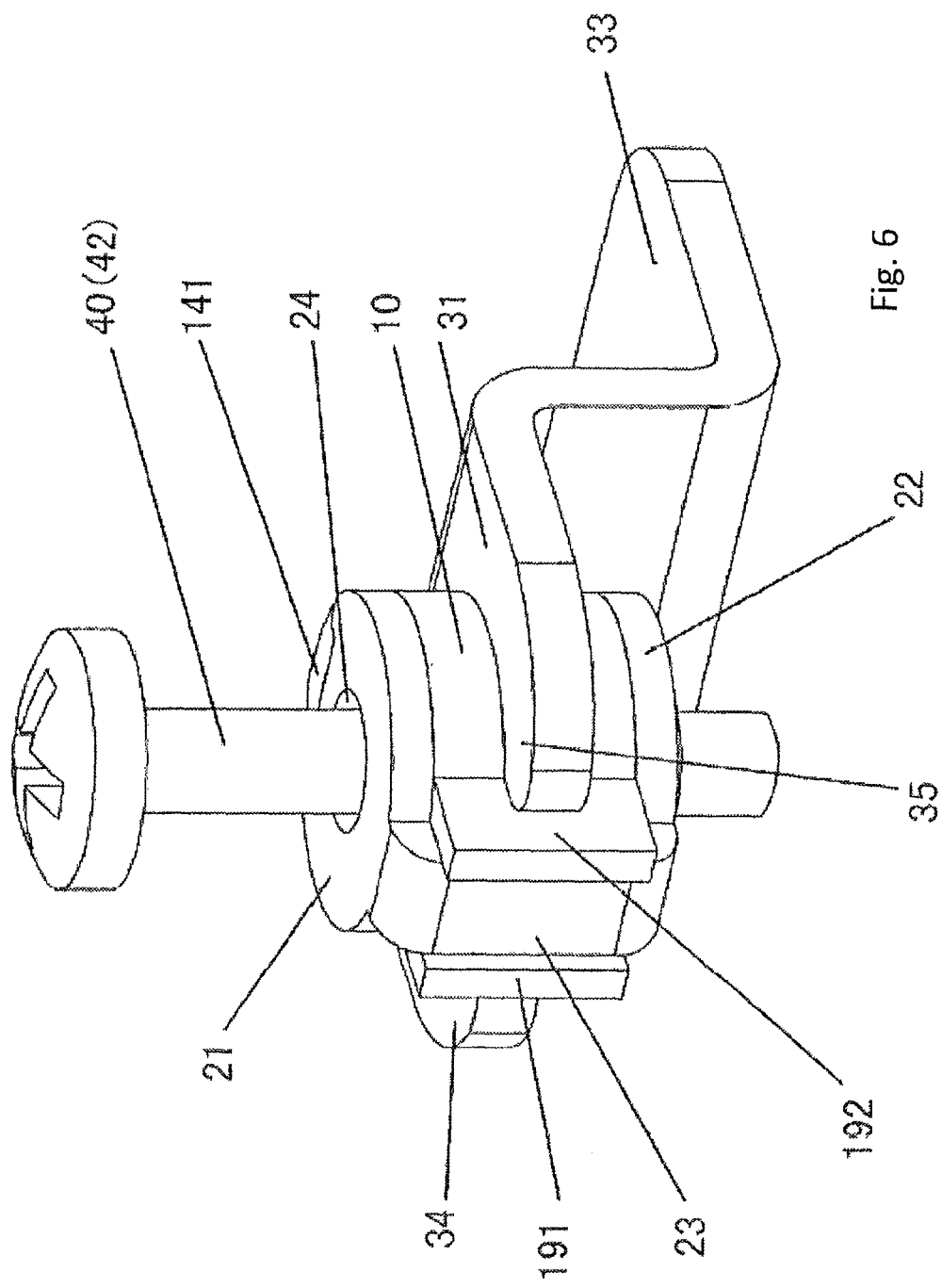
FIG. 6 is a schematic diagram showing the buffer member, the support portion, the connecting member and the fixing rod according to the first embodiment of the present invention being mounted.
Figure 7:
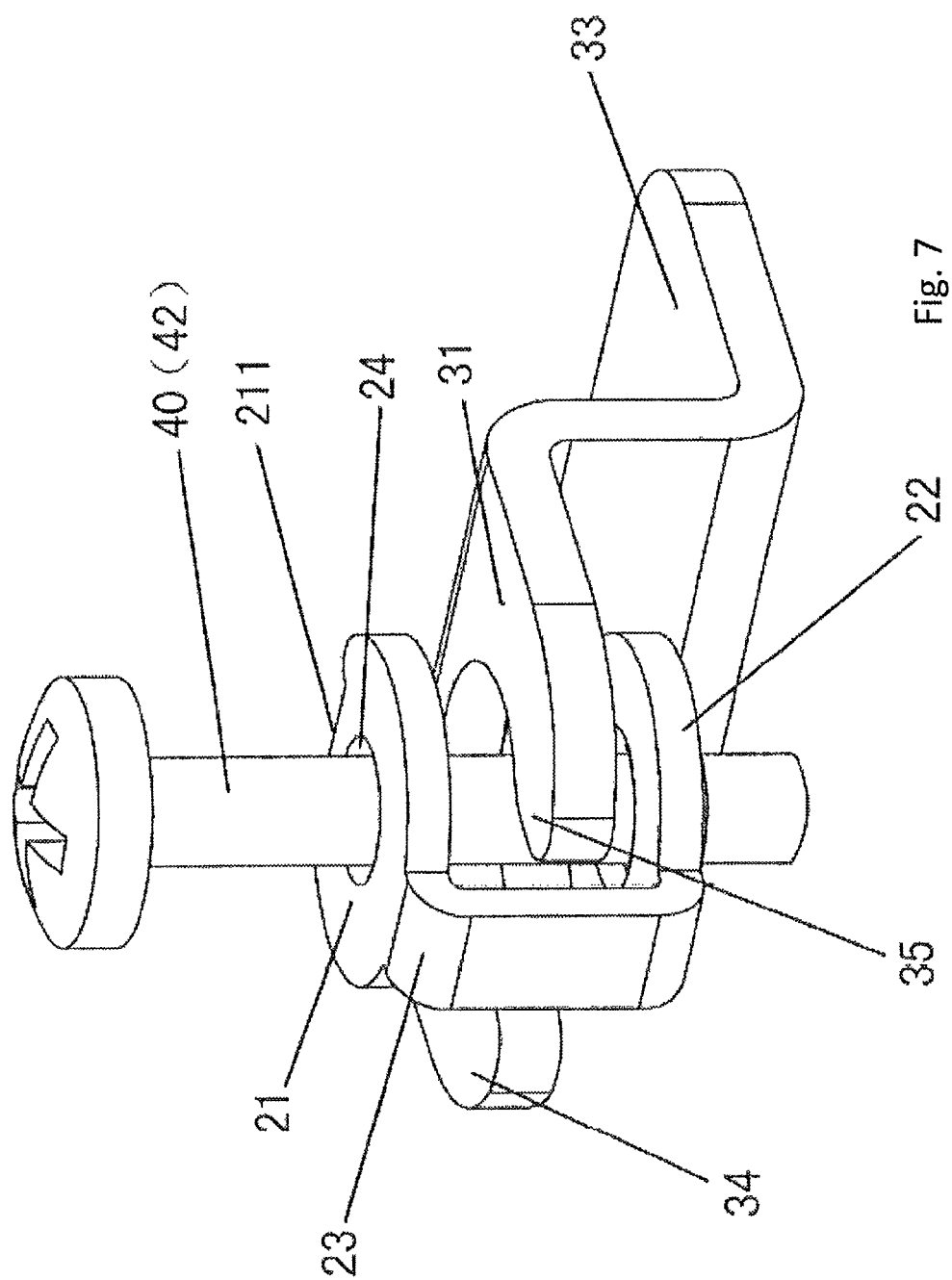
FIG. 7 is a schematic diagram of the arrangement of FIG. 6 with the buffer member being removed.

FIG. 6 is a schematic diagram showing the buffer member, the support portion, the connecting member and the fixing rod according to the first embodiment being mounted; and FIG. 7 is a schematic diagram of an arrangement of FIG. 6 with the buffer member being removed. As shown in FIGS. 2, 6 and 7, the fixing rod 40 is inserted into the second opening 24 of the upper plate block 21, the first opening 13 of the buffer member 10 and the third opening 25 of the lower plate block 22 in sequence.

Referring to FIGS. 2-7 again, the power source 100 of the first embodiment may comprise a kinetic energy generating component, such as a motor. The buffer member 10 may comprise a component having a buffering capability, such as a rubber pad. The fixing rod 40 may be a screw 41 or a threaded rod 42 with a nut (not shown). In the following embodiment, the threaded rod 42 with the nut (not shown) is described as an example.

In order to avoid vibration from the power source 100 from being delivered to the fixing plate 200 through the threaded rod 42, when the power source 100 is mounted to the fixing plate 200, firstly, the upper plate block 21 and the lower plate block 22 of the support portion 20 are arranged to respectively cover the upper portion 14 and the lower portion 15 of the buffer member 10; and then, the buffer member 10 snaps into the engagement portion 32 of the connecting member 30. The connecting member 30 and the buffer member 10 can be fixed together, because the upper portion 14 and the lower portion 15 of the buffer member 10 respectively extend transversely to form the upper portion extension 16 and the lower portion extension 17 with the gap 18 therebetween, and the connecting member 30 is provided with the engagement portion 32 being engageable into the gap 18. After that, the threaded rod 42 running through the power source 100 is inserted into the second opening 24 of the upper plate block 21, the first opening 13 of the buffer member 10 and the third opening 25 of the lower plate block 22 in sequence, so that the power source 100, the support portion 20 and the buffer member 10 are connected together and fixed by the nut 41. Finally, the fixing end 33 of the connecting member 30 is connected with the fixing plate 200, and thus the final mounting is done.

In order to firmly mount the power source 100 on the fixing plate 200, thus the support portion 20 may be made of a rigid metal material, and the connecting member 30 may be also made of a rigid metal material. With the engagement between the connecting member 30 and the buffer member 10, the rigid contact between the connecting member 30 and the support portion 20, and even the rigid contact between the connecting member 30 and the power source 100, are avoided. With this structure, not only the power source 100 can be indirectly connected with the fixing plate 200, but also the vibration generated by the power source 100 cannot be delivered to the fixing plate 200 through the threaded rod 42, thereby reducing the noise.

The support portion 20 is comprised of the upper plate block 21, the lower plate block 22 and the stop block 23, the upper plate block 21 and the lower plate block 22 of the support portion 20 are arranged to respectively cover the upper portion 14 and the lower portion 15 of the buffer member 10, and the stop block 23 connects the upper plate block 21 and the lower plate block 22, thereby substantially presenting a "⊐" shape. When the nut 41 is used for fixing, since a height of the support portion 20 is held by the stop block 23, the nut 41 can only be screwed to the lower plate block 22, but it cannot be rotated upward any more. That is, since the buffer member 10 is surrounded by the support portion 20, the nut 41 cannot contact the buffer member 10, and thus the buffer member 10 will not be pressed and deformed, and the vibration absorbing effect of the buffer member 10 would not be adversely affected.

Further, since the support portion 20 is made of a metal material, the upper plate block 21 will not collapse due to weight of the power source 100 located thereon. Particularly, when it is required to connect the power source 100 with the fixing plate 200 at two or more locations thereof, because of support provided by the support portion 20, the buffer member 10 will not be deformed due to the weight of the power source 100 or the non-uniform force of the operator for threading the screw, thus the power source 100 will not be inclined toward one side.

Referring to FIGS. 5-7, the engagement portion 32 of the connecting member 30 is Ω-shaped or U-shaped so as to form a first protrusion 34 and a second protrusion 35, and a distance h between the first protrusion 34 and the second protrusion 35 is less than a diameter (not shown) of the buffer member 10 in the gap.

The buffer member 10 is provided with a first protection block 191 and a second protection block 192 for preventing the stop block 23 from contacting the first protrusion 34 and the second protrusion 35, the first protrusion 34 contacts the first protection block 191, the second protrusion 35 contacts the second protection block 192, and the stop block 23 is arranged between the first protection block 191 and the second protection block 192.

Since an internal portion of the buffer member 10 is formed as a cylinder, and in order to fixing the connecting member 30 on the buffer member 10 more firmly, the engagement portion 32 of the connecting member 30 is designed in the a-shaped shape or the U-shaped shape so as to form the first protrusion 34 and the second protrusion 35. During the mounting, since the distance h between the first protrusion 34 and the second protrusion 35 is less than the diameter (not shown) of the buffer member 10, it is required to force and deform the buffer member 10 so that the buffer member 10 is inserted into the engagement portion 32 of the connecting member 30. After entering the engagement portion 32, the buffer member 10 will return to its natural form due to release of the force, and then be clamped and protected by the first protrusion 34 and the second protrusion 35 from falling off.

When tightening the nut 41, the threaded rod 42 will rotate with the rotation of the nut 41, causing the buffer member 10 and the support portion 20 to be rotated along with the rotation and to deviate from the original mounting orientation. Since the buffer member 10 is provided with the first protection block 191 and the second protection block 192, the stop block 23 is arranged between the first protection block 191 and the second protection block 192, and the first protrusion 34 and the second protrusion 35 of the connecting member 30 contact the first protection block 191 and the second protection block 192 respectively, the rigid contact between the connecting member 30 and the support portion 20 can be avoided, so that when the vibration generated by the power source 100 is delivered to the support portion 20, the vibration cannot be delivered to the connecting member 30 and even the fixing plate 200 through the stop block 23. Moreover, positions of the buffer member 10 and the support portion 20 are restricted so that they will not be rotated along with the rotation of the threaded rod 42, thereby facilitating the mounting.

As shown in FIG. 7 again, the distance h between the first protrusion 34 and the second protrusion 35 is less than the diameter (not shown) of the body of the threaded rod 42. Since the buffer member 10 is made of a nonmetal material such as rubber, aging phenomena of the buffer member 10 such as cracking, hardening or the like will occur due to various environment factors in service, which results in loss of use value. At this time, the buffer member 10 may be ruptured due to the presence of pressure. In order to avoid such phenomenon, the distance h between the first protrusion 34 and the second protrusion 35 is set to be less than the diameter (not shown) of the body of the threaded rod 42, so that the threaded rod 42 can only be disengaged from above or inserted into the engagement portion 32 of the connecting member 30 from above, but it cannot be disengaged from or inserted into the engagement portion 32 of the connecting member 30 in a transverse direction. Even if the buffer member 10 is cracked due to the aging phenomena, the threaded rod 42 would not be disengaged from the connecting member 30, and the power source 100 is still connected with the fixing plate 200.

Particularly, when the power source 100 and the fixing plate 200 are placed in a longitudinal direction perpendicular to the ground, the buffer member 10 will be adversely affected by the weight of the power source 100 located above the buffer member 10, which indirectly speeds up the aging rate of the buffer member 10. When cracking phenomenon occurs in the buffer member 10, since the distance between the first protrusion 34 and the second protrusion 35 is set to be less than the diameter (not shown) of the body of the threaded rod 42, so that the threaded rod 42 can be clamped or snapped between the first protrusion 34 and the second protrusion 35, and the power source 100 will not fall off or offset due to its gravity, so that the power source 100 is firmly connected with the fixing plate 200.

Referring to FIGS. 2 and 4 again, the third opening 25 of the support portion 20 is provided to extend downward and formed with a threaded recess 251. In order to connect the power source 100, the support portion 20 and the buffer member 10 together by the threaded rod 42, the nut 41 is often used for fixing. Generally, since the distance between the power source 100 and the fixing plate 200 will be affected by factors such as a height of a machine body, the power source 100 is often located close to the fixing plate 200, so that a mounting space between them cannot receive even two fingers. It is very difficult for an installer to thread the nut 41 onto the threaded rod 42 in such a narrow and small space. Since the third opening 25 of the lower plate block 22 of the support portion 20 is provided to extend downward and formed with a threaded recess 251, it is only required, during the mounting, that after the threaded rod 42 has passed through the second opening 24 to the recess 251 of the third opening 25, it is easy to fix the threaded rod 42 onto the support portion 20 by rotating the threaded rod 42 only, without the need of the nut 41 for fixing. Thus, operation convenience is improved, and cost is reduced.

Figure 8A:
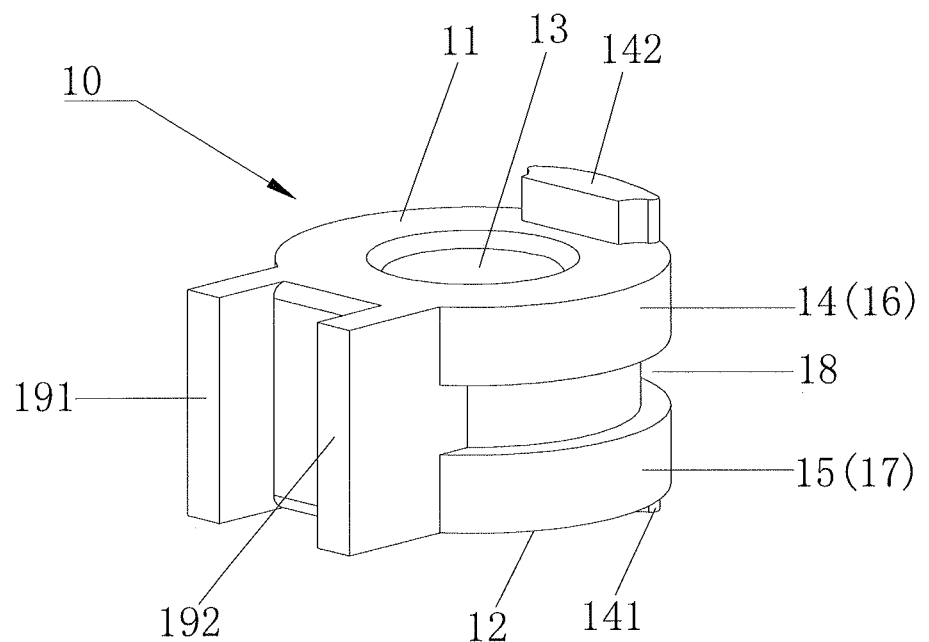
FIG. 8A is a perspective schematic diagram of another buffer member according to the present invention.
Figure 8B:
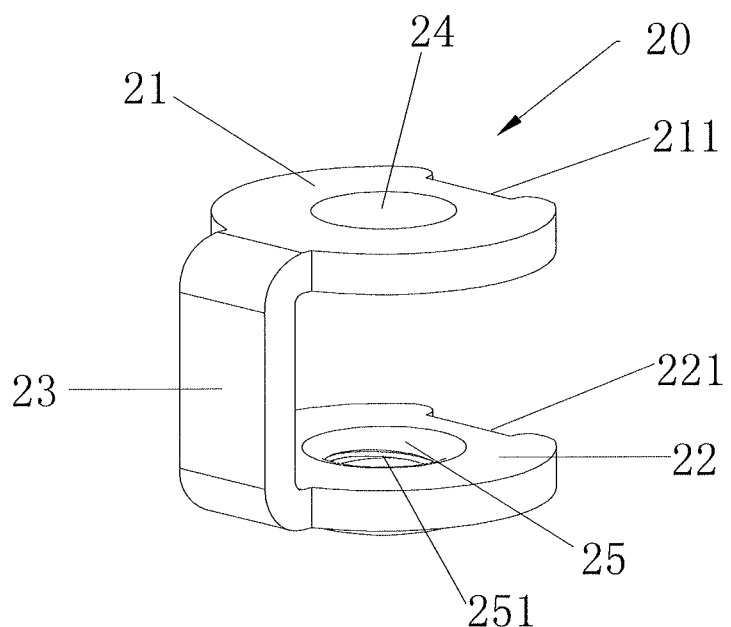
FIG. 8B is a schematic diagram of another support portion according to the present invention.

FIG. 8A is a perspective schematic diagram of another buffer member according to the present invention; and FIG. 8B is a schematic diagram of another support portion according to the present invention. As shown in FIGS. 8A and 8B, the upper portion 14 and the lower portion 15 of the buffer member 10 are provided with a first projection portion 141 and a second projection portion 142 respectively, the upper plate block 21 of the support portion 20 is provided with a first notch 211 engaged with the first projection portion 141, and the lower plate block 22 of the support portion 20 is provided with a second notch 221 engaged with the second projection portion 142. When mounting the threaded rod 42, since the buffer member 10 is made of a material such as rubber and a tool for mounting the threaded rod 42 usually applies a larger impulse force, the buffer member 10 is prone to be forced to offset from the support portion 20. By use of the arrangement in which the upper portion 14 and the lower portion 15 of the buffer member 10 are provided with the first projection portion 141 and the second projection portion 142 respectively, the upper plate block 21 of the support portion 20 is provided with the first notch 211 engaged with the first projection portion 141, and the lower plate block 22 of the support portion 20 is provided with the second notch 221 engaged with the second projection portion 142, the buffer member 10 can be better fixed into the support portion 20.

Second Embodiment

Figure 9:
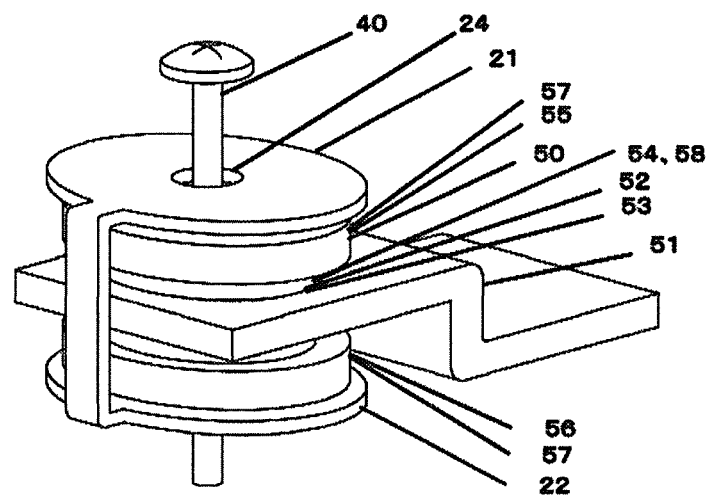
FIG. 9 is a schematic diagram showing an overall configuration according to a second embodiment of the present invention.
Figure 10:
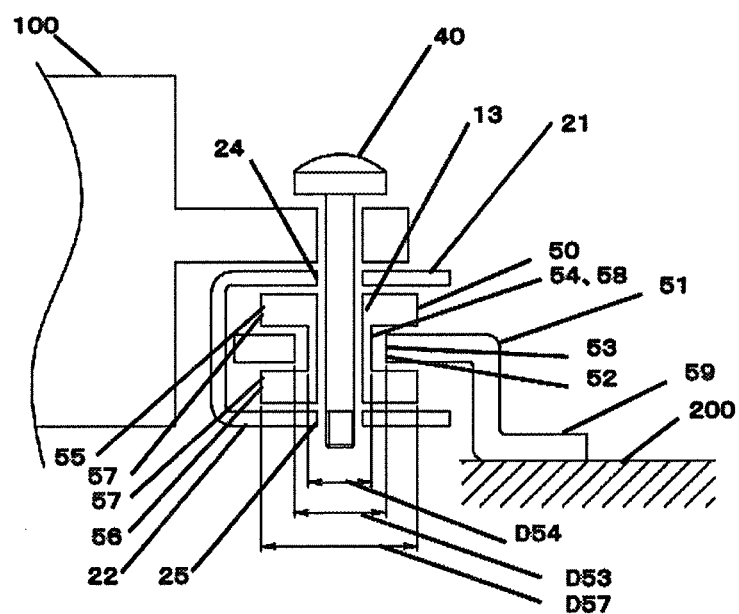
FIG. 10 is a schematic diagram showing a sectional configuration according to the second embodiment of the present invention.

FIG. 9 is a schematic diagram showing an overall configuration according to a second embodiment; and FIG. 10 is a schematic diagram showing a sectional configuration according to the second embodiment. As shown in FIGS. 9 and 10, the fixing rod 40 is inserted into the second opening 24 of the upper plate block 21, the first opening 13 of a buffer member 50 and the third opening 25 of the lower plate block 22 in sequence.

An engagement portion 52 of a connecting member 51 is in an opening shape formed as a fourth opening 53. An internal portion of the buffer member 50 is formed as a cylinder 54, and a diameter D53 of the fourth opening 53 is larger than a diameter D54 of the cylinder 54.

A fixing end 59 of the connecting member 51 is connected to the fixing plate 200.

The buffer member 50 is comprised of an end cylindrical portion 57 of an upper portion extension 55, an end cylindrical portion 57 of a lower portion extension 56, and a middle cylindrical portion 58 of the internal cylinder 54. Diameters D57 of the end cylindrical portions 57 are larger than the diameter D53 of the fourth opening 53 and are two times of a diameter D54 of the middle cylindrical portion 58 or less, and the end cylindrical portions are sized such that they are insertable through and mountable in the fourth opening 53 of the engagement portion 52 of the connecting member 51 after being elastically deformed by a finger.

The end cylindrical portions 57 are elastically deformed by the finger so that their sizes are smaller than that of the fourth opening 53 of the connecting member 51, and then penetrate through the fourth opening 53 of the connecting member 51. However, when the diameters D57 of the end cylindrical portions 57 are much larger than the diameter D54 of the middle cylindrical portion 58, mounting operability is poor because the buffer member 50 cannot be elastically deformed adequately by the finger.

Since the connecting member 51 is engaged with the buffer member 50, the rigid contact between the connecting member 51 and the power source 100 can be avoided. Such a structure can not only achieve indirect connection between the power source 100 and the fixing plate 200, but also prevent the vibration generated by the power source 100 from being delivered to the fixing plate 200, thereby reducing the noise.

Except the above description, other configurations, operations and effects are the same as the first embodiment and thus are not described in detail herein.

What is claimed is:

1. A noise reduction structure between a power source and a fixing plate, comprising:
    a buffer member provided with a first opening penetrating through upper and lower faces of a body of the buffer member, an upper portion and a lower portion of the buffer member respectively extending transversely to form an upper portion extension and a lower portion extension with a gap therebetween;
    a support portion made of a rigid material and comprised of an upper plate block provided with a second opening, a lower plate block being provided with a third opening, and a stop block connecting the upper plate block and the lower plate block, the buffer member being embedded and engaged between the upper plate block and the lower plate block;
    a connecting member having a free end provided with an engagement portion engaged with the gap and a fixing end connected onto the fixing plate; and
    a fixing rod running through the power source, connecting and fixing the support portion and the power source, but being separated from the fixing plate.

2. The noise reduction structure according to claim 1, wherein the fixing rod is inserted into the second opening of the upper plate block, the first opening of the buffer member and the third opening of the lower plate block in sequence.

3. The noise reduction structure according to claim 1, wherein
    the engagement portion of the connecting member is Ω-shaped or U-shaped so as to form a first protrusion and a second protrusion,
    a distance between the first protrusion and the second protrusion is less than a diameter of the buffer member in the gap, and
    an internal portion of the buffer member is formed as a cylinder.

4. The noise reduction structure according to claim 3, wherein the buffer member is provided with a first protection block and a second protection block for preventing the stop block from contacting the first protrusion and the second protrusion,
    the first protrusion contacts the first protection block,
    the second protrusion contacts the second protection block, and
    the stop block is arranged between the first protection block and the second protection block.

5. The noise reduction structure according to claim 3, wherein a distance between the first protrusion and second protrusion is less than a diameter of the fixing rod.

6. The noise reduction structure according to claim 1, wherein the buffer member is provided with a first protection block and a second protection block for preventing the stop block from contacting the first protrusion and the second protrusion,
the first protrusion contacts the first protection block,
the second protrusion contacts the second protection block, and
the stop block is arranged between the first protection block and the second protection block.

7. The noise reduction structure according to claim 1, wherein
the upper portion and the lower portion of the buffer member are provided with a first projection portion and a second projection portion respectively,
the upper plate block of the support portion is provided with a first notch engaged with the first projection portion, and
the lower plate block of the support portion is provided with a second notch engaged with the second projection portion.

8. The noise reduction structure according to claim 1, wherein the third opening of the support portion is provided to extend downward and form with a threaded recess.

9. The noise reduction structure according to claim 1, wherein the fixing rod is a screw or a threaded rod with a nut.

10. The noise reduction structure according to claim 1, wherein
the engagement portion of the connecting member is in an opening shape formed as a fourth opening,
an internal portion of the buffer member is formed as a cylinder, and
a diameter of the fourth opening is larger than that of the cylinder.

11. The noise reduction structure according to claim 10, wherein
the buffer member is comprised of an end cylindrical portion of the upper portion extension, an end cylindrical portion of the lower portion extension, and a middle cylindrical portion of the internal cylinder,
diameters of the end cylindrical portions are larger than that of the fourth opening and are two times of a diameter of the middle cylindrical portion or less, and
the end cylindrical portions are sized such that they are insertable through and mountable in the fourth opening of the engagement portion of the connecting member after being elastically deformed by a finger.

* * * * *